United States Patent
Ozden et al.

(10) Patent No.: US 12,258,845 B2
(45) Date of Patent: Mar. 25, 2025

(54) SUBTERRANEAN STORAGE OF HYDROGEN FOAMS

(71) Applicant: SAUDI ARABIAN OIL COMPANY, Dhahran (SA)

(72) Inventors: Sehmus Ozden, Katy, TX (US); Ayrat Gizzatov, Winchester, MA (US); Zuhair Al Yousef, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/347,469

(22) Filed: Jul. 5, 2023

(65) Prior Publication Data
US 2025/0012177 A1  Jan. 9, 2025

(51) Int. Cl.
*E21B 43/22* (2006.01)
*E21B 21/14* (2006.01)
*E21B 43/16* (2006.01)

(52) U.S. Cl.
CPC ................ *E21B 43/166* (2013.01)

(58) Field of Classification Search
CPC .......... C09K 8/594; C09K 8/584; C09K 8/38; C09K 8/94; E21B 43/16; E21B 43/164; E21B 37/06; E21B 43/26; E21B 21/00; E21B 21/062
See application file for complete search history.

(56) References Cited

U.S. PATENT DOCUMENTS

| | | | |
|---|---|---|---|
| 8,690,476 B2 | 4/2014 | Oates | |
| 9,759,053 B2 | 9/2017 | Mendell | |
| 11,180,318 B1 | 11/2021 | Ellerbusch | |
| 2016/0040518 A1* | 2/2016 | Potapenko | E21B 43/162 166/305.1 |
| 2016/0068736 A1* | 3/2016 | De Stefano | C09K 8/94 507/202 |
| 2016/0215604 A1* | 7/2016 | Potapenko | E21B 43/263 |
| 2023/0064753 A1 | 3/2023 | Ayirala et al. | |

FOREIGN PATENT DOCUMENTS

| | | |
|---|---|---|
| CN | 116119609 A | 5/2023 |
| WO | 2017183262 A1 | 10/2017 |

OTHER PUBLICATIONS

English translation of DE 3629769 (Year: 1987).*
English translation of CN 104619947 (Year: 2015).*
Aftab, A., Hassanpouryouzband, A., Xie, Q., Machuca, L. L. & Sarmadivaleh, M. Toward a Fundamental Understanding of Geological Hydrogen Storage. Industrial & Engineering Chemistry Research 61, 3233-3253, 2022.
Subsurface Hydrogen and Natural Gas Storage State of Knowledge and Research Recommendations Report. (2022).
Breelle, Y., Gelin, P., Meyer, C., & Petit, G., Technico-economic study of distributing hydrogen for automotive vehicles. International Journal of Hydrogen Energy, 4(4), 297-314. (1979).
Rahbari, A., Brenkman, J., Hens, R., Ramdin, M., Van Den Broeke, L. J. P., Schoon, R., Henkes, R., Moultos, O. A., & Vlugt, T. J. H. (2019). Solubility of water in hydrogen at high pressures: A molecular simulation study. Journal of Chemical and Engineering Data, 64(9), 4103-4115.
Tarkowski, R. (2019). Underground hydrogen storage: Characteristics and prospects. Renewable and Sustainable Energy Reviews, 105, 86-94.
Zivar, D., Kumar, S. & Foroozesh, J. Underground hydrogen storage: A comprehensive review. International Journal of Hydrogen Energy 46, 23436-23462, (2020).
Written Opinion and International Search Report from corresponding PCT Application No. PCT/US2024/036270 mailed Oct. 25, 2024.

* cited by examiner

*Primary Examiner* — Zakiya W Bates
(74) *Attorney, Agent, or Firm* — Vorys, Sater, Seymour and Pease LLP

(57) ABSTRACT

Hydrogen foams may be used for placing and maintaining hydrogen in a subterranean location. For example, methods for introducing hydrogen to a subterranean location may include: placing a hydrogen foam in a subterranean location, in which the hydrogen foam comprises a continuous phase generated from a foamable composition comprising an aqueous fluid and a discontinuous phase comprising at least hydrogen gas; and maintaining the hydrogen foam in the subterranean location.

20 Claims, No Drawings

SUBTERRANEAN STORAGE OF HYDROGEN FOAMS

FIELD OF THE DISCLOSURE

The present disclosure relates generally to storage of hydrogen gas and, more particularly, to introduction and storage of hydrogen gas in a subterranean location.

BACKGROUND OF THE DISCLOSURE

Hydrogen is an emerging clean energy source with potential to promote energy storage, electrical energy production, and vehicle propulsion, among other applications. The clean energy potential of hydrogen stems from its ability to be manufactured with low or no greenhouse gas emissions (including low or no carbon dioxide emissions) and minimal hazardous waste discharge. Hydrogen can similarly be converted to usable energy (including electrical energy) with low or no emissions using technologies such as fuel cells.

To facilitate the foregoing, storage or capturing of large volumes of hydrogen may be needed. Current techniques for hydrogen storage include hydrogen-binding materials and storage of hydrogen in surface containers. Hydrogen binding materials (also referred to as chemical storage) include a secondary material that chemically transforms the hydrogen into a storable form with a chemical input, and releases the hydrogen with another chemical input of a different type. Hydrogen binding materials are frequently expensive and often offer limited viability for long-term hydrogen storage. Surface container storage of hydrogen usually takes place in enclosed tanks and/or cylinders that store the hydrogen in either liquid or gas form, but may be challenging in various aspects. Surface container storage of hydrogen typically requires performing work upon (compression of) hydrogen gas to pressures of about 5,000 psi to 10,000 psi to provide sufficient storage density. Hydrogen gas typically has a low density of about 0.0838 $kg/m^3$ at ambient conditions (about 1 atm and 20° C.), while liquid hydrogen can have a density of 70.8 $kg/m^3$ at about 20 K. Thus, unless suitably compressed, the energy storage density offered by hydrogen is rather low. Due to its high volatility, excessive loss of hydrogen may also occur during surface container storage of hydrogen, especially boil-off occurring from liquid hydrogen. In addition, metal embrittlement of storage tanks may occur as a result of extended contact times with hydrogen. The combination of these features may render storage of large hydrogen volumes problematic and increase their expense.

Another approach for hydrogen storage or capturing involves injecting hydrogen into a subterranean location, which offers the potential for storage of large gas volumes. Subterranean locations may include subterranean formations and features within a subterranean formation. Subterranean locations that may be suitable for hydrogen storage include, but are not limited to, depleted oil and gas formations, saline aquifers, coal mines, caves and caverns, hollow salt formations, seepages, faults, fractures, drilled wellbores, and the like. Salt caverns and other subterranean features having large hollow volumes may allow for high rates of withdrawal and injection, as well as a large volume capacity at a single storage location. Technology suitable for introducing and removing fluids from subterranean formations is well-developed from the oilfield services industry and may be adapted for transporting hydrogen to and from a subterranean location. Although hydrogen may be introduced and stored readily in subterranean formations having large hollow volumes and sufficient sealing to promote hydrogen retention therein, hydrogen storage and retention in porous reservoirs (e.g., aquifers and depleted oil and gas reservoirs) may be much more problematic, since the low density and viscosity of hydrogen may make it considerably more difficult to displace native fluids to facilitate storage of the hydrogen. In addition, porous subterranean features may make retention of the hydrogen considerably more difficult.

In view of the foregoing, improved techniques for subterranean storage of hydrogen are needed.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Non-limiting methods of the present disclosure comprise: placing a hydrogen foam in a subterranean location; wherein the hydrogen foam comprises a continuous phase generated from a foamable composition comprising an aqueous fluid and a discontinuous phase comprising at least hydrogen gas; and maintaining the hydrogen foam in the subterranean location.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to storage of hydrogen gas and, more particularly, to introduction and storage of hydrogen gas in a subterranean location.

As discussed above, there are issues with existing hydrogen storage technologies. Hydrogen binding may be expensive and is not well suited for long-term hydrogen storage. Surface storage of hydrogen at high pressures in tanks or cylinders may be limited in capacity, and hydrogen embrittlement may compromise mechanical integrity of a storage tank or cylinder over time. Subterranean storage of hydrogen may facilitate storage of large hydrogen volumes, but the high mobility and volatility of hydrogen may be problematic for porous reservoirs, especially those having a native fluid present therein.

In response to the foregoing, the present disclosure provides systems and methods for introduction and storage of hydrogen gas within a subterranean location as a hydrogen foam. Hydrogen foam introduction and storage in a subterranean location may facilitate high-capacity storage at a relatively low cost, especially for subterranean locations having high porosity. By introducing a hydrogen foam to a subterranean location, the propensity toward leakage and migration of hydrogen gas may be significantly mitigated. Moreover, a hydrogen foam may facilitate more effective displacement of native fluids from the subterranean location and promote more effective filling of the available volume therein. Foamable compositions suitable for forming a hydrogen foam may be formulated based upon the anticipated conditions present in a given subterranean location and provide hydrogen foam stability that may be sufficient for extended subterranean storage periods. As a further advantage, existing equipment associated with hydrocarbon resource production may be present at a given subterranean location and may be modified to facilitate hydrogen foam introduction and removal according to the disclosure herein, thereby minimizing the need for additional capital equipment.

As used herein, the term "foam" refers to a stabilized dispersion of a large volume of gas in the form of gas bubbles of varying sizes in a relatively small volume of liquid. The liquid comprising the outer surface of the gas bubbles may define a continuous phase of the foam, and the gas within the gas bubbles may define a discontinuous phase of the foam. The term "hydrogen foam" refers to a foam comprising hydrogen gas and optionally one or more secondary gases in addition to hydrogen gas. The term "foam quality" refers to the percentage of gas in a volume of foam and may be calculated by dividing the quantity (total foam volume-liquid volume) by the total foam volume. The term "foamable composition" refers to a substance that is capable of forming a foam when exposed to suitable conditions, such as when being injected with a gas, but has not yet undergone foaming. That is, a "foamable composition" is not yet foamed as defined herein.

The hydrogen foam to be placed in the subterranean location may comprise a foamable composition comprising an aqueous fluid, which may undergo foaming upon exposure to hydrogen gas or maintain foam stability in the presence of hydrogen gas. More specifically, the hydrogen foam may comprise a continuous phase generated from the foamable composition and a discontinuous phase comprising at least hydrogen gas. Optionally, one or more secondary gases may also be present in the hydrogen foam in combination with the hydrogen gas. Suitable secondary gases may include, for example, methane, carbon dioxide, nitrogen, or any combination thereof. Foaming maybe facilitated with a foam stabilizing agent, as discussed in further detail herein below.

The aqueous fluid may comprise any suitable fluid for undergoing foam formation. In non-limiting examples, the aqueous fluid may comprise surface water, ground water, fresh water, salt water, brine, sea water, produced water, slickwater, the like, or any combination thereof. As used herein, the term "brine" refers to a saturated aqueous salt solution. An "aqueous salt solution" has a salt concentration (salinity) less than that of brine. Brines and aqueous salt solutions may comprise various inorganic salts therein. Example salts include, but are not limited to, sodium chloride (NaCl), calcium chloride dihydrate ($CaCl_2 \cdot 2H_2O$), magnesium chloride hexahydrate ($MgCl_2 \cdot 6H_2O$), barium chloride ($BaCl_2$), sodium sulfate ($Na_2SO_4$), sodium bicarbonate ($NaHCO_3$), sodium carbonate ($Na_2CO_3$), the like, or any combination thereof. In non-limiting examples, salt concentrations may range from 0.001 M (mol/L) to 5 M, or 0.001 M to 1 M, or 0.1 M to 2 M, or 1 M to 5 M, or greater than 5 M.

To promote foaming, the foamable compositions may comprise a foam stabilizing agent. Suitable foam stabilizing agents may include a polymer, a plurality of nanoparticles, a surfactant, or any combination thereof. Examples of these stabilizing agents are provided hereinafter. Advantageously, the foam stabilizing agent may be selected based upon the type of subterranean location into which the hydrogen foam is to be placed and/or the conditions present therein. One having ordinary skill in the art, with the benefit of this disclosure, may select an appropriate foam stabilizing agent for a particular type of subterranean formation or the conditions present therein.

In some embodiments, the foam stabilizing agent may comprise one or more surfactants. The one or more surfactants may comprise one surfactant or a combination of surfactants, which may be selected to promote formation and stabilization of the hydrogen foam. The one or more surfactants may be chosen based on various factors including, but not limited to, compatibility with the aqueous fluid, compatibility with the type of formation matrix present in the subterranean location, compatibility with conditions present within the subterranean location (e.g., temperature, pressure, pH, salinity, and the like), combinations thereof, and the like. Depending on conditions and the type of subterranean location, the surfactant may be cationic, anionic, zwitterionic, non-ionic (neutral), or any combination thereof. For example, when the subterranean location comprises a sandstone formation or other siliceous formation, one or more anionic surfactants or non-ionic surfactants may be desirable for use as the foam stabilizing agent, whereas in a carbonate formation, suitable surfactants may include one or more cationic or non-ionic surfactants. Non-ionic surfactants may be desirable for use in carbonate formations due to increased stability of non-ionic surfactants in high-salinity and high-temperature conditions commonly found in carbonate formations as well as potentially lower retention of the surfactant on the largely positively charged formation matrix. Zwitterionic surfactants may be used in either type of formation, sometimes in combination with at least one of cationic, anionic, or non-ionic surfactants.

The one or more surfactants may be selected to promote foam stability up to at least 100° C. and for a desired period of time. Examples of suitable surfactants that may be used as a foam stabilizing agent in the disclosure herein include, but are not limited to, zwitterionic surfactants such as lauramidopropyl hydroxysultaine (MACKAM® LSB-50, available from Solvay), cocamidopropyl hydroxysultaine (PETROSTEP®-SB, available from Stepan), cocamidopropyl betaine (AMPHOSOL® CG-50, available from Stepan), lauramidopropyl betaine (AMPHOSOL® LB, available from Stepan); anionic surfactants such as sodium alpha olefin sulfonate (STEPANTAN® AS-12 46, available from Stepan); cationic surfactants such as tallowamine ethoxylate, poe-8 (TOXIMUL® TA-8, available from Stepan), tris(2-hydroxyethyl)-N-tallowalkyl-1,3-diaminopropane (ETHODUOMEEN® T/13, available from Akzo Nobel), tallowtrimethylpropylenediamine (DUOMEEN® TTM, available from Akzo Nobel); the like, or any combination thereof. When used, the one or more surfactants may be present in the foamable composition at a concentration of, for example, 0.01 wt % to 15 wt %, or 0.01 wt % to 10 wt %, or 0.01 wt % to 5 wt %, or 0.01 wt % to 1 wt %, or 0.01 wt % to 0.5 wt %, or 0.05 wt % to 15 wt %, or 0.05 wt % to 10 wt %, or 0.05 wt % to 5 wt %, or 0.05 wt % to 1 wt %, or 0.05 wt % to 0.5 wt %, or 0.5 wt % to 15 wt %, or 0.5 wt % to 10 wt %, or 0.5 wt % to 5 wt %, or 0.5 wt % to 1 wt %, or 1 wt % to 15 wt %, or 1 wt % to 10 wt %, or 1 wt % to 5 wt %, based on total mass of the foamable composition prior to foaming.

In some embodiments, a fluorocarbon-based surfactant (i.e., a fluorosurfactant) may be present in the foamable composition. The fluorocarbon-based surfactant may be used in combination with a hydrocarbon-based surfactant, such as a zwitterionic hydrocarbon-based surfactant or an anionic hydrocarbon-based surfactant. The fluorocarbon-based surfactant may, without being bound by theory, enhance formation of the hydrogen foam and/or increase stability of the hydrogen foam due to the high surface activity of the fluorocarbon-based surfactant, leading to enhanced interaction of the aqueous fluid with the hydrogen gas.

In some embodiments, the foam stabilizing agent may comprise a polymer, such as a synthetic polymer (e.g., a polyacrylamide-based polymer, such as a polyacrylamido-t-butyl-sulfonate-based polymer), a natural polymer (e.g., xanthan gum, guar gum, or the like), or any combination thereof. Like surfactants, the ability of a polymer to promote foaming may be impacted by factors such as, for example, salinity, pH, shear rate effects, temperature and the like. When used, the polymer may be present in the foamable composition at a concentration of, for example, 0.05 wt % to 15 wt %, or 0.05 wt % to 10 wt %, or 0.05 wt % to 5 wt %, or 0.05 wt % to 1 wt %, or 0.05 wt % to 0.5 wt %, or 0.5 wt % to 15 wt %, or 0.5 wt % to 10 wt %, or 0.5 wt % to 5 wt %, or 0.5 wt % to 1 wt %, or 1 wt % to 15 wt %, or 1 wt % to 10 wt %, or 1 wt % to 5 wt %, or about 0.2 wt %, based on total mass of the foamable composition prior to foaming.

In some embodiments, the foam stabilizing agent may comprise a plurality of nanoparticles. As used herein, the term "nanoparticle" refers to a particle having average dimension(s) on the scale of 0.1 nanometers (nm) to 10,000 nm, preferably 0.1 nm to 1000 nm, and more preferably 0.1 nm to 100 nm. Like surfactants and polymers, nanoparticles may aid in promoting the formation and stability of a hydrogen foam. Advantageously, nanoparticles may promote foaming under which surfactants and/or polymers may prove unsuitable, such as high salinity conditions. Suitable nanoparticles for promoting foam formation according to the disclosure herein may include, but are not limited to, silica nanoparticles, metal nanoparticles, polymer nanoparticles, surface modified nanoparticles, the like, or any combination thereof. When used, the plurality of nanoparticles may be present in the foamable composition at a concentration of, for example, 0.01 wt % to 15 wt %, or 0.01 wt % to 10 wt %, or 0.01 wt % to 5 wt %, or 0.01 wt % to 1 wt %, or 0.01 wt % to 0.5 wt %, or 0.05 wt % to 15 wt %, or 0.05 wt % to 10 wt %, or 0.05 wt % to 5 wt %, or 0.05 wt % to 1 wt %, or 0.05 wt % to 0.5 wt %, or 0.5 wt % to 15 wt %, or 0.5 wt % to 10 wt %, or 0.5 wt % to 5 wt %, or 0.5 wt % to 1 wt %, or 1 wt % to 15 wt %, or 1 wt % to 10 wt %, or 1 wt % to 5 wt %, based on total mass of the foamable composition prior to foaming.

The discontinuous phase in the hydrogen foam may comprise hydrogen gas or a mixture of hydrogen gas and one or more secondary gases. The hydrogen gas (or mixture of hydrogen gas and one or more secondary gases) may be present in the hydrogen foam (as the discontinuous phase) at a concentration of 0.001 vol % to 99.9 vol %, or 1 vol % to 99 vol %, or 1 vol % to 50 vol %, or 1 vol % to 25 vol %, or 5 vol % to 25 vol %, or 5 vol % to 50 vol %, or 50 vol % to 90 vol %, or 75 vol % to 95 vol %, based on total volume of the foam. When present, the one or more secondary gases may include methane, carbon dioxide, nitrogen, or any combination thereof. The one or more secondary gases may be used to regulate factors including, for example, volumetric energy density, solubility, and the like. The ratio of hydrogen gas to the one or more secondary gases on a volume basis may range from about 0.1:99.9 to 99.9 to 0.1, or 1:99 to 99:1, or 5:95 to 95:5, or 10:90 to 90:10, or 25:75 to 75:25, or 40:60 to 60:40, based on a total gas volume in the hydrogen foam. In one example, a suitable hydrogen foam may comprise 10 vol % to 70 vol % hydrogen, based on the total gas volume in the hydrogen foam, with the balance of gas in the hydrogen foam consisting essentially of methane. It should be noted that the hydrogen gas and the one or more secondary gases may be introduced to form the hydrogen foam at the same time or at different times, as further discussed below.

Additional components that may be optionally present in the foamable compositions may include, but are not limited to, water-miscible solvents (e.g., an alcohol or polyol), cellulose, starches, buffers, weighting agents (e.g., barium sulfate), emulsifiers, de-emulsifiers, dispersants, crosslinking agents, antioxidants, heat stabilizers, foam control agents, plasticizers, fillers, rheology modifiers, and the like. Examples of other suitable additional components will be familiar to one having ordinary skill in the art.

Once introduced to the subterranean location, the hydrogen foams may be stored therein for a desired period of time. The hydrogen foam may promote storage of hydrogen in the subterranean location for at least about 7 days, or at least about 14 days, or at least about 21 days, or at least about 30 days, or at least about 60 days, or at least about 90 days, or at least about 180 days, or at least about 365 days. It is to be appreciated that an appropriate storage period may depend upon consumer factors, such as when the hydrogen needs to be withdrawn from the subterranean location and provided to a consumer for an intended application. More generally, however, the storage period in the subterranean location may be dictated by the time over which the hydrogen foam maintains adequate stability for retaining the hydrogen gas as a discontinuous phase within the foam. Factors potentially influencing the stability of the hydrogen foam are specified in more detail above.

The manner in which the hydrogen foam is placed in the subterranean location is not believed to be especially limited and may be dictated by the type of subterranean location and the conditions present therein. In some examples, the hydrogen foam may be formed external to the subterranean location (e.g., on the earth's surface using surface foaming equipment) and then introduced into the subterranean location already in foamed form. In other examples, the foamable composition may be introduced to the subterranean location, and the hydrogen foam may then be formed in the subterranean location (downhole). In still another example, a precursor foam comprising one or more secondary gases may be formed on the surface (or downhole), and after placing the precursor foam in the subterranean location, hydrogen gas may then be injected into the precursor foam to displace at least a portion of the one or more secondary gases therefrom and form the hydrogen foam in the subterranean location.

Suitable subterranean locations for introduction and storage of a hydrogen foam according to the present disclosure may include, but are not limited to, a sandstone formation, a carbonate formation, a salt formation, depleted oil and gas formations, saline aquifers, coal mines, the like, or any combination thereof. The subterranean location may have any suitable structure including, but not limited to, hollow caverns, seepages, faults, fractures, drilled wellbores, the like, or any combination thereof. The subterranean location may preferably comprise a porous formation matrix capable of accepting and storing the introduced gas mixture, including hydrogen gas.

Depending on the desired hydrogen storage capacity, the subterranean location may be of any available size and any accessible depth, such as, for example, from approximately 500 m to 3000 m, or 500 m to 1500 m, or 1000 m to 3000 m in depth. Pressure in the subterranean location may increase with increasing depth. The hydrogen foam may be stored within the subterranean location at a pressure of approximately 500 psi to 3000 psi, or 500 psi to 1500 psi, or 1000 psi to 3000 psi. Temperature in the subterranean location may increase with increasing depth. The hydrogen foam may be stored within the subterranean location at a temperature of approximately 30° C. to 100° C., or 40° C. to 70° C., or 30° C. to 60° C., or preferably 40° C. to 90° C.

Accordingly, methods of the present disclosure may comprise placing a hydrogen foam into a subterranean location, wherein the hydrogen foam comprises a continuous phase generated from a foamable composition comprising an aqueous fluid and a discontinuous phase comprising at least hydrogen gas, and maintaining the hydrogen foam in the subterranean location. Optionally, one or more secondary gases may also be present in the hydrogen foam. Optionally, the hydrogen foam may displace a native fluid (e.g., formation water, a wellbore fluid, a formation gas, or the like), and preferably, the hydrogen foam may displace the native formation fluid from a pore space of the subterranean location and may enter a pore space within the subterranean location.

A system capable of introducing a hydrogen foam (or a foamable composition) to a subterranean location may include one or more wellheads. Each wellhead may be fluidly connected to the subterranean location via a tubing and wellbore extending into the subterranean location to a desired depth. The tubing may supply the hydrogen foam or foamable composition to the subterranean location, wherein the foamable composition may be supplied to the wellhead (and optionally foamed at the wellhead using surface equipment) from one or more storage locations. Similarly, hydrogen may be supplied to the wellhead from one or more storage locations. The system may further comprise one or more pumps, one or more compressors, or any combination thereof fluidly connected to the wellhead. The one or more pumps, the one or more compressors, or any combination thereof may be used to pressurize the foamable composition or hydrogen foam to promote delivery to the subterranean location and/or to promote injection of hydrogen gas into the foamable composition. Hydrogen gas, the foamable composition, and other fluids may be supplied to the wellhead from any suitable source including, but not limited to, pipelines, storage tanks, tank railcars, tanker trucks, the like, or any combination thereof.

In some embodiments, placing the hydrogen foam may comprise forming the hydrogen foam using surface equipment (external to the subterranean location). In particular, such methods may comprise forming the hydrogen foam external to the subterranean location by injecting the hydrogen gas and optionally one or more secondary gases into the foamable composition, and introducing the hydrogen foam into the subterranean location. Suitable surface equipment for generating a hydrogen foam will be familiar to one having ordinary skill in the art. Introducing the hydrogen foam into the subterranean location may occur through one or more wellheads and tubing associated therewith. Any suitable injection rate of the hydrogen foam into the subterranean location may be used.

In some embodiments, placing the hydrogen foam into the subterranean location may comprise introducing a foamable composition into the subterranean location and forming the hydrogen foam within the subterranean formation. In particular, such methods may comprise introducing the foamable composition into the subterranean formation, and forming the hydrogen foam within the subterranean location by injecting hydrogen gas and optionally one or more secondary gases into the foamable composition within the subterranean formation. When injecting hydrogen gas into the foamable composition within the subterranean location, the injection rate of the hydrogen gas and the optionally one or more secondary gases may be any suitable injection rate to facilitate placement of the hydrogen foam. The injection rate of the foamable composition into the subterranean location may be any suitable injection rate to facilitate placement of the hydrogen foam. It should be noted that the injection pressure of the hydrogen gas and the optional one or more secondary gases may be below the fracturing pressure of the subterranean location, in order to avoid damage to the pore space therein. It should additionally be noted that the foamable composition and the hydrogen gas and the optional one or more secondary gases may be injected into the subterranean location in any order or any sequence, including separate injection of some or all components of the foamable composition or the one or more secondary gases. In some preferred embodiments, the foamable composition may be introduced into the subterranean location before injection of the hydrogen gas or the one or more secondary gases. Additionally, it should be noted that the foamable composition, the hydrogen gas and/or the one or more secondary gases, or combinations thereof, may be introduced to the subterranean location via one wellhead or in more than one wellhead under varying conditions.

In some embodiments, placing the hydrogen foam into the subterranean location may comprise forming a precursor foam from one or more secondary gases and then displacing at least a portion of the one or more secondary gases to form the hydrogen foam. Such methods may comprise forming a precursor foam external to the subterranean location by injecting one or more secondary gases into the foamable composition, introducing the precursor foam into the subterranean location, and forming the hydrogen foam within the subterranean location by injecting hydrogen gas into the precursor foam within the subterranean location. Injection of hydrogen gas into the precursor foam may displace at least a portion of the one or more secondary gases to form a hydrogen foam comprising a mixture of hydrogen gas and the one or more secondary gases. Alternately, the foamable composition may be introduced to the subterranean location, and the one or more secondary gases may be injected into the foamable composition to form the precursor foam within the subterranean location. Thereafter, the hydrogen gas may be injected into the precursor foam to form the hydrogen foam within the subterranean location.

As an illustrative and non-limiting example of using a precursor foam to promote formation of a hydrogen foam according to the present disclosure, a secondary gas comprising methane may be combined with a foamable composition to form a precursor foam external to a subterranean location. The precursor foam may then be injected through a wellhead into a subterranean location, and hydrogen gas may then be injected into the subterranean location to form a hydrogen foam comprising hydrogen gas and at least a portion of the one or more secondary gases.

Embodiments disclosed herein include:

A. Methods for placing a hydrogen foam into a subterranean location. The methods comprise placing a hydrogen foam in a subterranean location; wherein the hydrogen foam comprises a continuous phase generated from a foamable composition comprising an aqueous fluid and a discontinuous phase comprising at least hydrogen gas; and maintaining the hydrogen foam in the subterranean location.

Embodiment A may have one or more of the following additional elements in any combination:

Element 1: wherein placing the hydrogen foam in the subterranean location comprises: forming the hydrogen foam external to the subterranean location by injecting the hydrogen gas and optionally one or more secondary gases into the foamable composition; and introducing the hydrogen foam into the subterranean location.

Element 2: wherein placing the hydrogen foam in the subterranean location comprises: introducing the foamable composition into the subterranean location; and forming the hydrogen foam within the subterranean location by injecting the hydrogen gas and optionally one or more secondary gases into the foamable composition within the subterranean location.

Element 3: wherein the one or more secondary gases are present.

Element 4: wherein the one or more secondary gases comprise methane, carbon dioxide, nitrogen, or any combination thereof.

Element 5: wherein placing the hydrogen foam in the subterranean location comprises: forming a precursor foam external to the subterranean location by injecting one or more secondary gases into the foamable composition; introducing the precursor foam into the subterranean location; and forming the hydrogen foam within the subterranean location by injecting the hydrogen gas into the precursor foam within the subterranean location.

Element 6: wherein placing the hydrogen foam in the subterranean location comprises: introducing the foamable composition into the subterranean location; forming a precursor foam within the subterranean location by injecting one or more secondary gases into the foamable composition within the subterranean location; and forming the hydrogen foam within the subterranean location by injecting the hydrogen gas into the precursor foam within the subterranean location.

Element 7: wherein the one or more secondary gases comprise methane, carbon dioxide, nitrogen, or any combination thereof.

Element 8: wherein the foamable composition comprises a foam stabilizing agent.

Element 9: wherein the foam stabilizing agent comprises a polymer, a plurality of nanoparticles, a surfactant, or any combination thereof.

Element 10: wherein the foam stabilizing agent comprises one or more surfactants and the subterranean location comprises a sandstone formation, the one or more surfactants comprising at least one anionic surfactant, at least one non-ionic surfactant, or any combination thereof.

Element 11: wherein the foam stabilizing agent comprises one or more surfactants and the subterranean location comprises a carbonate formation, the one or more surfactants comprising at least one cationic surfactant, at least one non-ionic surfactant, or any combination thereof.

Element 12: wherein the surfactant comprises at least one fluorocarbon-based surfactant.

Element 13: wherein a temperature of the subterranean location is from about 40° C. to about 100° C.

Element 14: wherein a pressure of the subterranean location is from 500 psi to 3000 psi.

Element 15: wherein the aqueous fluid comprises a brine.

Element 16: wherein the method further comprises displacing a native fluid within the subterranean location with the hydrogen foam.

By way of non-limiting example, exemplary combinations applicable to embodiment A include, but are not limited to: Element 1 with Element 3; Element 1 with Element 3 and Element 4; Element 2 with Element 3; Element 2 with Element 3 and Element 4; Element 3 with Element 4; Element 5 with Element 7; Element 6 with Element 7; Element 8 with Element 9 or Element 10 or Element 11; Element 8 with Element 9 and Element 12; Element 1 or Element 2 or Element 5 or Element 6 with Element 13; Element 1 or Element 2 or Element 5 or Element 6 with Element 14; Element 1 or Element 2 or Element 5 or Element 6 with Element 15; Element 1 or Element 2 or Element 5 or Element 6 with Element 16; Element 1 or Element 2 or Element 5 or Element 6 with Element 8; and Element 1 or Element 2 or Element 5 or Element 6 with Element 8 and Element 9 or Element 10 or Element 11.

Additional embodiments disclosed herein include:

Clause 1. A method comprising: placing a hydrogen foam in a subterranean location; wherein the hydrogen foam comprises a continuous phase generated from a foamable composition comprising an aqueous fluid and a discontinuous phase comprising at least hydrogen gas; and maintaining the hydrogen foam in the subterranean location.

Clause 2. The method of clause 1, wherein placing the hydrogen foam in the subterranean location comprises: forming the hydrogen foam external to the subterranean location by injecting the hydrogen gas and optionally one or more secondary gases into the foamable composition; and introducing the hydrogen foam into the subterranean location.

Clause 3. The method of clause 1, wherein placing the hydrogen foam in the subterranean location comprises: introducing the foamable composition into the subterranean location; and forming the hydrogen foam within the subterranean location by injecting the hydrogen gas and optionally one or more secondary gases into the foamable composition within the subterranean location.

Clause 4. The method of clause 2 or clause 3, wherein the one or more secondary gases are present.

Clause 5. The method of any one of clauses 2-4, wherein the one or more secondary gases comprise methane, carbon dioxide, nitrogen, or any combination thereof.

Clause 6. The method of clause 1, wherein placing the hydrogen foam in the subterranean location comprises: forming a precursor foam external to the subterranean location by injecting one or more secondary gases into the foamable composition; introducing the precursor foam into the subterranean location; and forming the hydrogen foam within the subterranean location by injecting the hydrogen gas into the precursor foam within the subterranean location.

Clause 7. The method of clause 1, wherein placing the hydrogen foam in the subterranean location comprises: introducing the foamable composition into the subterranean location; forming a precursor foam within the subterranean location by injecting one or more secondary gases into the foamable composition within the subterranean location; and forming the hydrogen foam within the subterranean location by injecting the hydrogen gas into the precursor foam within the subterranean location.

Clause 8. The method of clause 6 or clause 7, wherein the one or more secondary gases comprise methane, carbon dioxide, nitrogen, or any combination thereof.

Clause 9. The method of any one of clauses 1-8, wherein the foamable composition comprises a foam stabilizing agent.

Clause 10. The method of clause 9, wherein the foam stabilizing agent comprises a polymer, a plurality of nanoparticles, a surfactant, or any combination thereof.

Clause 11. The method of clause 10, wherein the foam stabilizing agent comprises one or more surfactants and the subterranean location comprises a sandstone formation, the one or more surfactants comprising at least one anionic surfactant, at least one non-ionic surfactant, or any combination thereof.

Clause 12. The method of clause 10, wherein the foam stabilizing agent comprises one or more surfactants and the subterranean location comprises a carbonate formation, the one or more surfactants comprising at least one cationic surfactant, at least one non-ionic surfactant, or any combination thereof.

Clause 13. The method of any one of clauses 10-12, wherein the surfactant comprises at least one fluorocarbon-based surfactant.

Clause 14. The method of any one of clauses 1-13, wherein a temperature of the subterranean location is from about 40° C. to about 100° C.

Clause 15. The method of any one of clauses 1-14, wherein a pressure of the subterranean location is from 500 psi to 3000 psi.

Clause 16. The method of any one of clauses 1-15, wherein the aqueous fluid comprises a brine.

Clause 17. The method of any one of clauses 1-16, further comprising: displacing a native fluid within the subterranean location with the hydrogen foam.

To facilitate a better understanding of the embodiments described herein, the following examples of various representative embodiments are given. In no way should the following examples be read to limit, or to define, the scope of the present disclosure.

Examples

Example 1. Sample surfactants were tested for stability in several aqueous brine fluids. Aqueous brine fluid compositions tested are specified in Table 1 below. The surfactants tested are specified in Table 2 below.

TABLE 1

| | Concentration (mol/L) | |
| --- | --- | --- |
| | Sample 1 | Sample 2 |
| NaCl | 0.7022 | 1.2764 |
| $CaCl_2 \cdot 2H_2O$ | 0.0162 | 0.3387 |
| $MgCl_2 \cdot 6H_2O$ | 0.0868 | 0.0648 |
| $BaCl_2$ | 0.00 | 0.0001 |
| $Na_2SO_4$ | 0.0447 | 0.0042 |
| $NaHCO_3$ | 0.0020 | 0.00607 |
| $Na_2CO_3$ | 0.00 | 0.00 |

TABLE 2

| Sample | Surfactant | Chemical Name | Surfactant Type |
| --- | --- | --- | --- |
| A | MACKAM ® LSB-50 (Solvay) | lauramidopropyl hydroxysultaine | zwitterionic |
| B | PETROSTEP ®-SB (Stepan) | cocamidopropyl hydroxysultaine | zwitterionic |
| C | AMPHOSOL ® CG-50 (Stepan) | cocamidopropyl betaine | zwitterionic |
| D | AMPHOSOL ® LB(Stepan) | lauramidopropyl betaine | zwitterionic |
| E | STEPANTAN ® AS-12 46 (Stepan) | sodium alpha olefin sulfonate | anionic |
| F | TOXIMUL ® TA-8 (Stepan) | tallow amine ethoxylate | cationic |
| G | ETHODUOMEEN ® T/13 (Akzo Nobel) | tris(2-hydroxyethyl)-N-tallow alkyldiaminopropane | cationic |
| H | DUOMEEN ® TTM (Akzo Nobel) | tallow trimethylpropylene-diamine | cationic |

The aqueous brines were formulated with 0.2 wt % surfactant based on total mass of solution and were aged in an oven at 100° C. for at least one month. The cationic surfactants were protonated with acid prior to dissolution. Upon removal from the oven, samples were visually inspected for precipitation or phase separation. No precipitation or phase separation was observed in the tested samples over the observation period, and all tested samples retained foaming capability, thus indicating compatibility and stability at the elevated temperatures of the samples tested. Samples were also shaken and visually observed to at least partially form a foam after aging, indicating the continued stability of surfactant in all samples tested.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A method comprising:
    placing a hydrogen foam in a subterranean location;
        wherein the hydrogen foam comprises a continuous phase generated from a foamable composition comprising an aqueous fluid and a discontinuous phase comprising at least hydrogen gas, wherein the hydrogen gas is present in the hydrogen foam at a concentration of 0.001 vol % to 99.9 vol %, based on total volume of the hydrogen foam; and
    maintaining the hydrogen foam in the subterranean location;
        wherein the foamable composition comprises a foam stabilizing agent comprising a polymer, a plurality of nanoparticles, a surfactant, or any combination thereof, and,
        wherein the surfactant comprises at least one fluorocarbon-based surfactant.

2. The method of claim 1, wherein placing the hydrogen foam in the subterranean location comprises:
    forming the hydrogen foam external to the subterranean location by injecting the hydrogen gas and optionally one or more secondary gases into the foamable composition; and
    introducing the hydrogen foam into the subterranean location.

3. The method of claim 2, wherein the one or more secondary gases are present.

4. The method of claim 3, wherein the one or more secondary gases comprise methane, carbon dioxide, nitrogen, or any combination thereof.

5. The method of claim 1, wherein placing the hydrogen foam in the subterranean location comprises:
    introducing the foamable composition into the subterranean location; and
    forming the hydrogen foam within the subterranean location by injecting the hydrogen gas and optionally one or more secondary gases into the foamable composition within the subterranean location.

6. The method of claim 5, wherein the one or more secondary gases are present.

7. The method of claim 6, wherein the one or more secondary gases comprise methane, carbon dioxide, nitrogen, or any combination thereof.

8. The method of claim 1, wherein placing the hydrogen foam in the subterranean location comprises:
    forming a precursor foam external to the subterranean location by injecting one or more secondary gases into the foamable composition;
    introducing the precursor foam into the subterranean location; and
    forming the hydrogen foam within the subterranean location by injecting the hydrogen gas into the precursor foam within the subterranean location.

9. The method of claim 8, wherein the one or more secondary gases comprise methane, carbon dioxide, nitrogen, or any combination thereof.

10. The method of claim 1, wherein placing the hydrogen foam in the subterranean location comprises:
    introducing the foamable composition into the subterranean location;
    forming a precursor foam within the subterranean location by injecting one or more secondary gases into the foamable composition within the subterranean location; and
    forming the hydrogen foam within the subterranean location by injecting the hydrogen gas into the precursor foam within the subterranean location.

11. The method of claim 10, wherein the one or more secondary gases comprise methane, carbon dioxide, nitrogen, or any combination thereof.

12. The method of claim 1, wherein a temperature of the subterranean location is from about 40° C. to about 100° C.

13. The method of claim 1, wherein a pressure of the subterranean location is from 500 psi to 3000 psi.

14. The method of claim 1, wherein the aqueous fluid comprises a brine.

15. The method of claim 1, further comprising:
displacing a native fluid within the subterranean location with the hydrogen foam.

16. The method of claim 1, wherein the surfactant further comprises:
at least one anionic surfactant, at least one non-ionic surfactant, or any combination thereof; or
at least one cationic surfactant, at least one non-ionic surfactant, or any combination thereof.

17. A method comprising:
placing a hydrogen foam in a subterranean location;
wherein the hydrogen foam comprises a continuous phase generated from a foamable composition comprising an aqueous fluid and a discontinuous phase comprising at least hydrogen gas, wherein the hydrogen gas is present in the hydrogen foam at a concentration of 0.001 vol % to 99.9 vol %, based on total volume of the hydrogen foam; and
maintaining the hydrogen foam in the subterranean location;
wherein the subterranean location comprises a sandstone formation, and
wherein the foamable composition comprises a foam stabilizing agent comprising one or more surfactants comprising at least one anionic surfactant, at least one non-ionic surfactant, or any combination thereof.

18. The method of claim 17, wherein the one or more surfactants further comprise a fluorocarbon-based surfactant.

19. A method comprising:
placing a hydrogen foam in a subterranean location;
wherein the hydrogen foam comprises a continuous phase generated from a foamable composition comprising an aqueous fluid and a discontinuous phase comprising at least hydrogen gas, wherein the hydrogen gas is present in the hydrogen foam at a concentration of 0.001 vol % to 99.9 vol %, based on total volume of the hydrogen foam; and
maintaining the hydrogen foam in the subterranean location;
wherein the subterranean location comprises a carbonate formation, and
wherein the foamable composition comprises a foam stabilizing agent comprising one or more surfactants comprising at least one cationic surfactant, at least one non-ionic surfactant, or any combination thereof.

20. The method of claim 19, wherein the one or more surfactants further comprise a fluorocarbon-based surfactant.

* * * * *